No. 804,735. PATENTED NOV. 14, 1905.
F. J. KOBUSCH.
HEATING DRUM.
APPLICATION FILED DEC. 13, 1904.
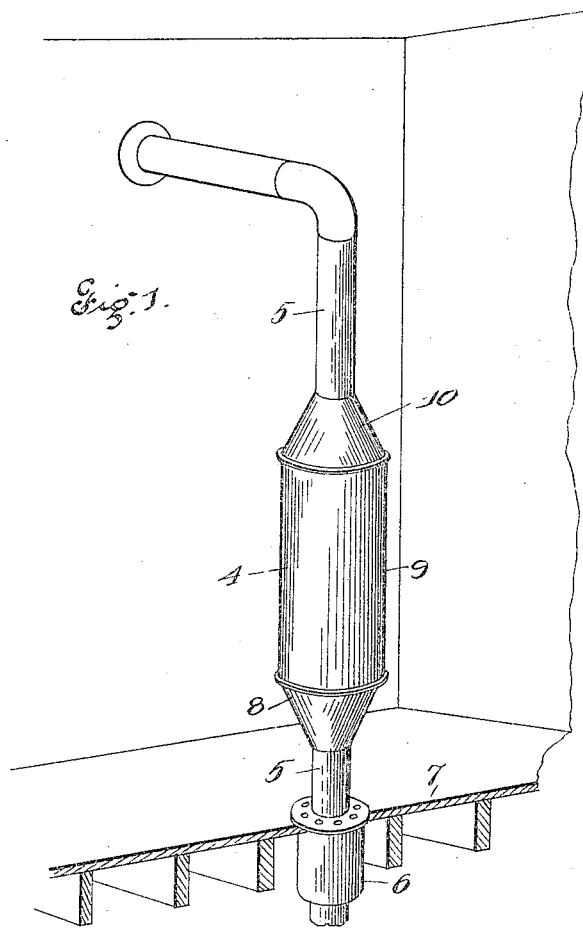
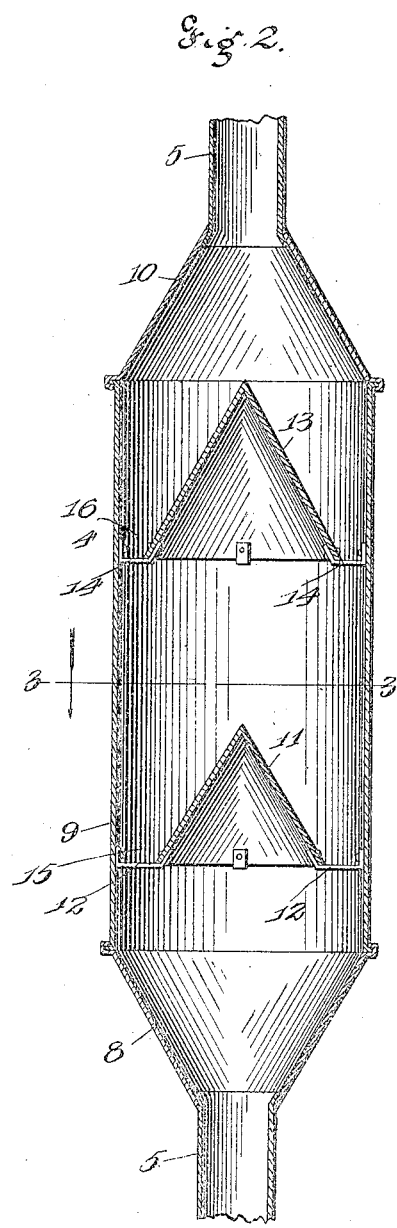
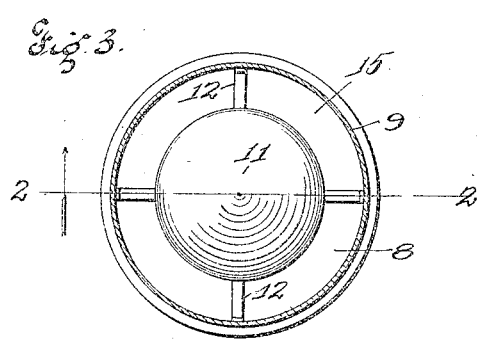
Witnesses
Alfred A. Eicks
M. M. Brazill
Inventor
F. J. Kobusch
By Higdon & Longan & Hopkins Attys.

UNITED STATES PATENT OFFICE.

FREDRICH J. KOBUSCH, OF ST. LOUIS, MISSOURI.

HEATING-DRUM.

No. 804,735.   Specification of Letters Patent.   Patented Nov. 14, 1905.

Application filed December 13, 1904. Serial No. 236,771.

*To all whom it may concern:*

Be it known that I, FREDRICH J. KOBUSCH, a citizen of the United States, and a resident of St. Louis, Missouri, have invented certain new and useful Improvements in Heating-Drums, of which the following is a specification containing a full, clear, and exact description, reference being had to the accompanying drawings, forming a part hereof.

My invention relates to improvements in heating-drums; and it consists of the novel features herein shown, described, and claimed.

The object of my invention is to provide a heating-drum which is located in and connected to a vertical line of stovepipe and to arrange a pair of conical baffle-plates within the heating-drum, which tend to retain the heat rising through the drum and cause the same to be radiated throughout the room in which the drum is located.

In the drawings, Figure 1 is a perspective showing the heating-drum embodying the principles of my invention in position for use, the building being broken away to economize space. Fig. 2 is an enlarged vertical central section of the drum and taken on the line 2 2 of Fig. 3 and looking in the direction indicated by the arrow. Fig. 3 is a horizontal cross-section on the line 3 3 of Fig. 2 and looking in the direction indicated by the arrow.

Referring to the drawings in detail, the heating-drum 4 is adapted to be incorporated into a stovepipe 5, said stovepipe running down through the thimble 6 in the floor 7 to a stove or other suitable heating device in the lower room, the object being to heat a bedroom or other upper room from the lower room. If desired, the drum may be incorporated into a stovepipe in the room in which the stove is located. The lower end of the outwardly-flaring section 8 is connected to the upper end of the stovepipe 5, the cylindrical section 9 is connected to the upper end of the flaring section 8, and the inwardly-tapering section 10 is connected to the upper end of the cylindrical section 9 and to the lower end of the upper part of the pipe 5, the drum thus forming, in effect, an enlargement of the stovepipe. The smaller lower cone 11 is mounted upon the arms 12 in the lower end of the cylinder 9, and the large cone 13 is mounted upon the arms 14 near the upper end of the cylinder 9, there being passages 15 upwardly around the cone 11 and smaller passages 16 upwardly around the cone 13. It will be observed that the inclined walls of the upper cone 13 extend parallel to the similarly-inclined walls of the said tapering upper section 10.

The smoke, gases, and heat passing upwardly through the lower part of the pipe 5 will pass into the lower end of the heating-drum, strike the bottom of the cone 11 and be interrupted, pass upwardly around the cone through the passage 15 and strike the bottom of the cone 13 and pass upwardly around the cone through the passage 16 and will be directed against the inclined walls of said upper tapering section 10 by the adjacent walls of the said cone 13, and on upwardly through the upper part of the pipe 5. The cones serve as baffle-plates to interrupt the passage of the heat and hold it in the drum, from which it may be radiated into the room. By making these baffle-plates cone-shaped with the points upwardly any soot and cinders will fall down around the cones and not clog the drum. The lower cone 11 is purposely made smaller than the upper cone in order that it will furnish less resistance to the smoke and products of combustion arising in the drum, and the smaller diameter of this lower cone provides a larger space between its lower edge and the wall of the drum through which the soot may fall downwardly through the drum.

The heating-drum is intended, primarily, for use in a room at a distance from the stove or other heating device, so as to utilize the smoke in heating this distant room. The heating-drum may also be used in the same room with the stove or heater.

I claim—

In an improved heating-drum, the combination with a straight cylinder having tapered ends, of a small imperforate cone supported and held in the lower end of the drum above the tapered end thereof, and a larger imperforate cone supported and held in the upper end of the drum below the tapered end thereof, substantially as specified.

In testimony whereof I have signed my name to this specification in presence of two subscribing witnesses.

FREDRICH J. KOBUSCH.

Witnesses:
 ALFRED A. EICKS,
 M. D. SCHULZE.